United States Patent
Schelbert et al.

(10) Patent No.: US 7,579,559 B2
(45) Date of Patent: Aug. 25, 2009

(54) CONTROL KNOB HAVING INTEGRATED FUNCTIONALITY

(75) Inventors: Harald Schelbert, Bad Koenigshofen (DE); Andreas Kramlich, Schweinfurt (DE); Martin Jeitner, Ostheim (DE)

(73) Assignee: PREH GmbH, Bad Neustadt/Saale (DE)

( * ) Notice: Subject to any disclaimer, the term of this patent is extended or adjusted under 35 U.S.C. 154(b) by 0 days.

(21) Appl. No.: 12/018,156

(22) Filed: Jan. 22, 2008

(65) Prior Publication Data

US 2008/0202906 A1    Aug. 28, 2008

Related U.S. Application Data

(63) Continuation of application No. PCT/EP2006/007045, filed on Jul. 18, 2006.

(30) Foreign Application Priority Data

Jul. 19, 2005 (DE) .......................... 102005033552
Apr. 21, 2006 (DE) .......................... 102006018518

(51) Int. Cl.
*H01H 9/00* (2006.01)
(52) U.S. Cl. .................. 200/4; 200/5 R; 200/61.54
(58) Field of Classification Search .............. 200/4, 200/5 R, 14, 6 A, 17 R, 18, 336, 61.54, 61.27, 200/61.28, 61.85, 61.88; 341/20, 27, 31, 341/35; 345/156, 161, 184
See application file for complete search history.

(56) References Cited

U.S. PATENT DOCUMENTS

| | | | | |
|---|---|---|---|---|
| 5,973,276 A | * | 10/1999 | Koyasu | 200/61.54 |
| 6,003,367 A | * | 12/1999 | Bux et al. | 73/462 |
| 6,420,667 B1 | * | 7/2002 | Miwa et al. | 200/4 |
| 6,441,327 B1 | * | 8/2002 | Shibata et al. | 200/61.27 |
| 6,534,732 B2 | * | 3/2003 | Karasik et al. | 200/61.54 |
| 7,348,503 B2 | * | 3/2008 | Shiroyama et al. | 200/4 |
| 7,361,854 B2 | * | 4/2008 | Basche et al. | 200/18 |
| 7,427,721 B2 | * | 9/2008 | Muneyoshi et al. | 200/4 |
| 7,439,458 B2 | * | 10/2008 | Montalvo | 200/4 |
| 7,450,108 B2 | * | 11/2008 | Clabunde et al. | 345/157 |

* cited by examiner

*Primary Examiner*—Michael A Friedhofer
(74) *Attorney, Agent, or Firm*—Muncy, Geissler, Olds & Lowe, PLLC

(57) ABSTRACT

A control knob for use in a motor vehicle is provided, having a hub for attachment of the control knob to a shaft, a torsion-proof part, a rotatable part, a rotation angle sensor, means for generating rotary haptics, and an electronic system by means of which the components, located in the control knob, can be controlled and the signals of the sensors can be evaluated and via which the control knob can be connected to the on-board electronics of the motor vehicle.

9 Claims, 3 Drawing Sheets

CONTROL KNOB HAVING INTEGRATED FUNCTIONALITY

This nonprovisional application is a continuation of International Application No. PCT/EP2006/007045, which was filed on Jul. 18, 2006, and which claims priority to German Patent Application Nos. DE 102005033552 and DE 102006018518, which were filed in Germany on Jul. 19, 2005 and Apr. 21, 2006, respectively, and which are both herein incorporated by reference.

BACKGROUND OF THE INVENTION

1. Field of the Invention

The present invention relates to a control knob for a motor vehicle, which combines a plurality of functions such as the generation of haptics and different actuating functions.

2. Description of the Background Art

Very different functions in motor vehicles are operated increasingly with the use of a single menu in conjunction with an on-board computer. A central control element, which combines a plurality of input functions, for example, pushbuttons and rotary sensors, is often used for this purpose. In this case, the haptics of the control button are frequently dynamically adjustable, for example, in the form of exposed detents or end stops.

A disadvantage of previously known generic control elements is the costly adaptation to the particular vehicle type.

SUMMARY OF THE INVENTION

It is therefore an object of the present invention to provide a control knob, which combines a plurality of functionalities and can be easily adapted to the motor vehicle.

The inventive control knob for use in a motor vehicle has a hub for attachment of the control knob to a shaft, a torsion-proof part, a rotatable part, a rotation angle sensor, means for generating rotary haptics, and an electronic system by means of which the components, located in the control knob, can be controlled and the signals of the sensors can be evaluated and via which the control knob can be connected to an electronic system of the motor vehicle.

The control knob is mounted with its hub on the shaft and thus affixed in the motor vehicle. The hub is mounted either rigidly or tiltable in one or more directions, so that with a tiltably mounted shaft the control knob functions as the handle of a joystick. The torsion-proof part of the control button is not rotatable around the shaft, whereas the rotatable part is arranged rotatable relative to the torsion-proof part. The rotatable part is preferably a ring, which forms a part of the peripheral area of the operating knob.

The rotational position of the rotatable part is detectable by means of the rotation angle sensor. To this end, the rotation angle sensor is formed as an absolute value device or as an incremental rotation angle sensor. An absolute value device supplies the absolute rotation angle of the rotatable part, whereas an incremental rotation angle sensor signals a rotation by a defined extent. The means for generating the rotational haptics give(s) the user a tactile feedback on the actuation of the rotatable part.

The electronic system is used to control the components located in the control knob such as, for example, the means for generating the rotational haptics. In addition, the electronic system evaluates the signals from the sensor, for example, from the rotation angle sensor, and prepares these so that they can be transmitted directly to the on-board electronics of the motor vehicle.

In this case, the connection of the control knob to the on-board electronics occurs preferably via a data bus. The electronics of the control knob are now advantageously designed so that they receive the desired haptics of the control knob via the data bus and control the components accordingly and send information on an actuation of the control knob in an appropriate message via the data bus. The control knob is therefore adaptable to a vehicle type in that the electronic system is designed or programmed according to the on-board electronics.

In an embodiment of the invention, a means for generating the rotational haptics is formed by a detent spring acting together with a detent contour. In this case, the detent spring engages in the detent contour and is deformed during rotation of the rotatable part, which results in a defined rotational resistance. This principle for detent generation is familiar to the person skilled in the art and is therefore not elaborated further. It is also preferable for the detent spring to be disposed in the torsion-proof part of the control knob and for the detent contour to engage in the rotatable part.

In another embodiment, an adjustable tappet, which can be brought into contact with the detent contour, is disposed in the control knob. If the adjustable tappet is in contact with the detent contour, an additional force opposes the rotation of the rotatable part. The user perceives this counterforce as a special detent, for example, as a center detent. The adjustable tappet is brought into contact with the detent contour or removed from it, for example, by means of an electromagnet. There is a detailed description of the functional principle in the German Pat. Application No. 10 2005 043 587.4 of the applicant.

In another embodiment of the invention, the control knob has a locking device to block the rotation of the rotatable part. Dynamically connectable and freely positionable end stops, which contribute to the generation of the rotational haptics, are realized by this locking device. Preferably, the locking device is formed by at least one electromagnet, by which a ball can be brought into contact with a locking contour disposed on the rotatable part. The electromagnet in this case pulls the ball into a position in which it jams between the locking contour in the rotatable part and the torsion-proof part and thereby blocks further rotation of the rotatable part. The functional principle and the design of a locking device of this type are described in detail in the German Pat. Application No. 10 2005 024 883.5, which is herein incorporated by reference.

In another embodiment of the locking device, a permanent magnet is moved by means of an electromagnet between two positions. A ball follows the position of the permanent magnet and therefore also changes between two positions. In one position, the ball is jammed between the torsion-proof part of the control knob and the locking contour, so that the rotation of the rotatable part is blocked. In the second position of the ball, the rotation is released. The functional principle and the exemplary embodiments of a blocking device of this type are described in detail in the German Pat. Application No. 10 2006 015 294.8, which is herein incorporated by reference.

In an embodiment of the invention, the locking contour is disposed on a ring-shaped end face of the rotatable part. The end face is located in the interior of the control knob, for example, as an extension of an area, usable by the user, of the rotatable part. It is also preferable for the locking contour to be designed so that the end stops enabled by it coincide with the stop positions created by the detent contour and the detent spring.

In another embodiment of the invention, a symbol is disposed on the top side of the control knob. Preferably, this symbol is illuminated by a lighting means, whereby in particular different search and function illuminations can be generated. The control of the lighting means also occurs by means of the control knob electronics.

In a modification of the present embodiment, means to display a variable symbol on the top side of the control knob are disposed in the control knob. These means include, for example, a display and one or more light sources for the transillumination of the display. Different symbols are preferably stored in the control knob electronics, which control the display or the light sources. The on-board electronics of the motor vehicle tell the control knob via the data bus which of the symbols is to be displayed. Alternatively or in addition, the on-board electronics transmit the entire symbol to the control knob in an established format via the data bus. It is possible thereby, for example, during an update of the operating software of the motor vehicle to add new symbols, which were not yet available during the installation of the control knob in the motor vehicle. Possible embodiments of the means to display the variable symbol can be derived from the German Pat. Applications No. 103 42 142.4 or No. 10 2005 043 588.2, which are herein incorporated by reference.

In an embodiment of the invention, the control knob has a pushbutton, particularly on the top side of the control knob. To this end, a button cap, which preferable forms part of the top side of the control knob, can be moved in a translational manner relative to the rest of the control knob. The actuation of the pushbutton can be detected with the aid of a switching means. The switching means acts as a sensor, whose signal the control knob electronics evaluates and transmits to the on-board electronics of the motor vehicle.

In an alternative embodiment, the control knob is slidable along the shaft relative to the hub. As a result, it is not a button cap that is moved relative to the rest of the control knob but the entire control knob relative to the hub by which it is attached to the shaft.

The electronic system of the control element receives commands, on the one hand, from the on-board electronics on the desired response of the control element. It generates control signals therefrom for the components such as an adjustable tappet, an electromagnet of a locking device, a lighting means, or a display. On the other hand, the electronic system evaluates the output signals of the component such as the rotation angle sensor and a switch or pushbutton and transmits the corresponding information to the on-board electronics.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
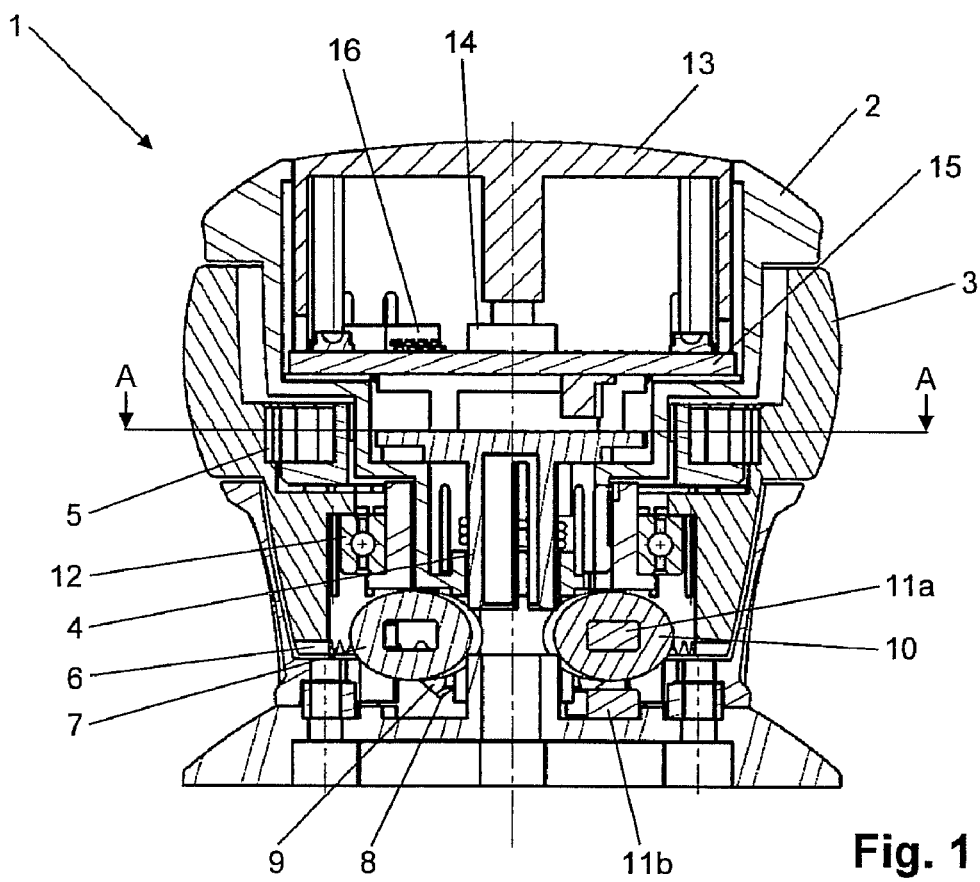
FIG. 1 shows a sectional view of a control knob of the invention.

FIG. 1 shows a sectional view of an inventive control knob 1 with a torsion-proof part 2, a rotatable part 3, and a hub 4. Control knob 1 is mounted on a shaft, which is not shown, by means of hub 4. This shaft is mounted either rigidly or tiltable in the motor vehicle. With a tiltable mounting, control knob 1 is used in addition to its own functionality as a handle of a joystick.

A ring-shaped area of the rotatable part 3 forms an area on the exterior of control knob 1 and can be rotated by the user there. The area, within control knob 1, of rotatable part 3 is connected via a mount 12, for example, a ball bearing, with the torsion-proof part 2 of the control knob. Rotatable part 3 does not extend to the top side of control knob 1; this achieves that during tilting or pressing of control knob 1, rotatable part 3 is not unintentionally moved by the user.

A detent contour 5 is inserted at an inner periphery of rotatable part 3. This can be seen particularly in FIG. 2, which shows an alternative sectional view of control knob 1 along the line A-A. A pretensioned detent spring 7, which during rotation of rotatable part 3 is elastically deformed by the edges of detent contour 5 and thus opposes the rotation with a force, engages in detent contour 5. This force is perceived by the user as rotational haptics and generates the detent positions of rotatable part 3.

The rotation of rotatable part 3 can be blocked by means of a locking device. The locking device includes the two electromagnets 7 and 10, by means of which a ball can be brought in contact with a locking contour 6 disposed on rotatable part 3. Electromagnet 7 moves ball 9; the ball moved by electromagnet 10 is covered in FIG. 1. Locking contour 6 is disposed on a ring-shaped end face of rotatable part 3. Each of the electromagnets 7 and 10 blocks a rotation direction of rotatable part 3. Electromagnet 10 is pushed onto a U-shaped iron core with the legs 11a and 11b. The direction of the magnetic field in the iron core can be reversed by a different current feed to electromagnet 10. Depending on the direction of the magnetic field in the iron core, a permanent magnet, which is not shown, moves between a top position before leg 11a and a bottom position before leg 11b. To explain the functional principle of the locking device, the iron core of electromagnet 7 was left out in FIG. 1. A permanent magnet, which is not shown, can also be moved between a top and bottom position by means of electromagnet 7. The movement of the electromagnet follows a magnetizable ball 9. In the top position of the permanent magnet and thereby ball 9, ball 9 engages in locking contour 6 and thus blocks the rotation of rotatable part 3. In the bottom position of the permanent magnet, ball 9 is located in pocket 8, where it does not impede the rotation of rotatable part 3.

Control knob 1 further has a rotation angle sensor by means of which a rotation of the rotatable part can be detected. In the present exemplary embodiment, the rotation angle sensor includes a light barrier 19, disposed in torsion-proof part 2, and an encoding ring 18 disposed on rotatable part 3. During a rotation of rotatable part 3, encoding ring 18 moves through the detection area of light barrier 19. The output signal of light barrier 19 changes by means of the recesses in encoding ring 18, as a result of which the rotation angle and the rotation direction of rotatable part 3 are determined. This determination is known to the person skilled in the art and is therefore not elaborated in greater detail.

Control knob 1 has in addition a pushbutton with which, for example, a selected function of the on-board computer can be activated. The pushbutton includes a button cap 13, which can be pressed into torsion-proof part 2, and a switch 14. Switch 14, on the one hand, detects an actuation of button cap 13 and, on the other, brings it back to its starting position after its actuation.

Printed circuit board 15 carries the control knob electronics 16, which controls all components of control knob 1 and evaluates the signals from the sensor. Moreover, it creates the electronic contact to the on-board electronics of the motor vehicle, for example, via a data bus. Electronics 16 receives from the on-board computer information on which functions control knob 1 is to provide currently, and accordingly controls the components such as, for example, electromagnets 7 and 10. In addition, electronics 16 evaluates the signal from light barrier 19 and switch 14. The evaluated data are transmitted via the data bus to the on-board electronics of the motor vehicle. Control knob 1 therefore can be used with only minor modifications in many motor vehicles. Only the interface for the connection to the vehicle bus must be adapted.

Figure 2:
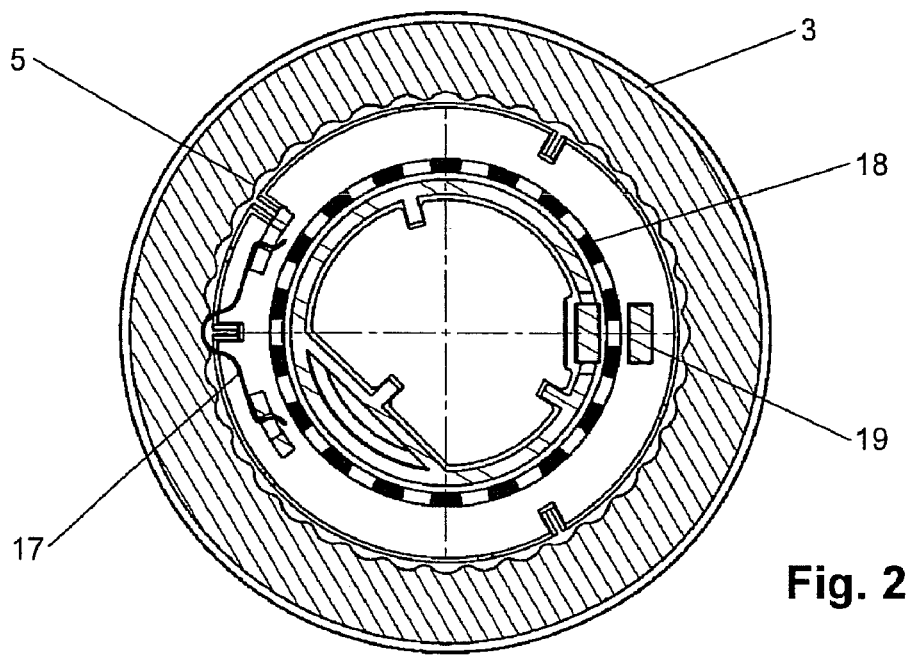
FIG. 2 shows another sectional view of the control knob of FIG. 1 along the line A-A.
Figure 3:
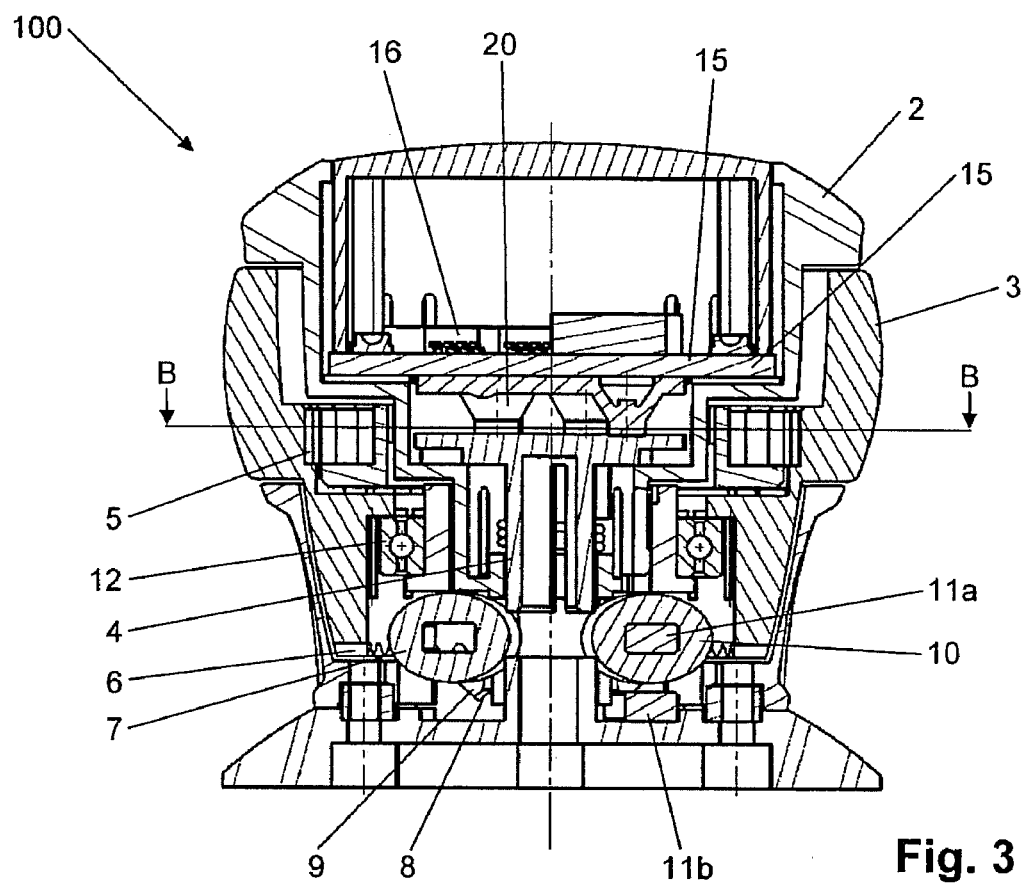
FIG. 3 shows the sectional view of another embodiment of a control knob of the invention.
Figure 4:
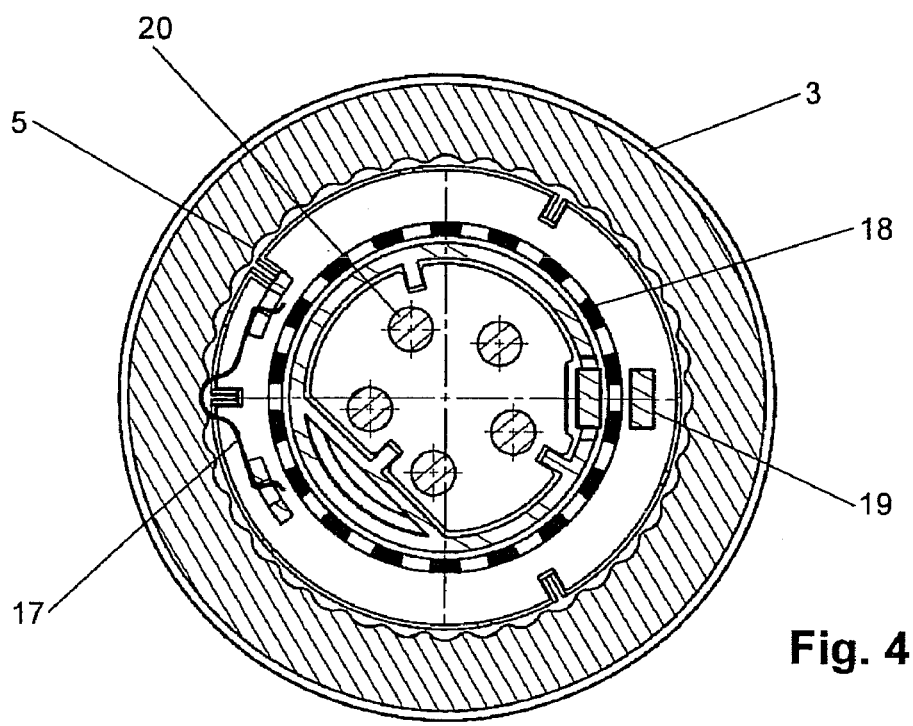
FIG. 4 shows another sectional view of the control knob of FIG. 3 along the line B-B.

FIGS. 3 and 4 show a modification of control knob 1 analogous to FIGS. 1 and 2. The structure of control knob 100 corresponds substantially to that of control knob 1, but without button cap 13 and switch 14. The same or identically acting components are given the same reference characters. The area formed by button cap 13 in control knob 1 is rigidly connected in control knob 100 to torsion-proof part 2. In contrast, control knob 100 is slidable with its torsion-proof part 2 and its rotatable part 3 in a translational manner relative to hub 4 and thereby along the shaft. The touch function is therefore also executed by pressing essentially the entire control knob 100. When control knob 100 is pressed, the contact dome of switch 20 is pressed against a stationary plate of hub 4 and thereby triggers a touch function, which is detected by electronics 16. Switches 20 simultaneously apply a reset force, which brings control knob 100 back to its starting position after the pressing.

Figure 5:
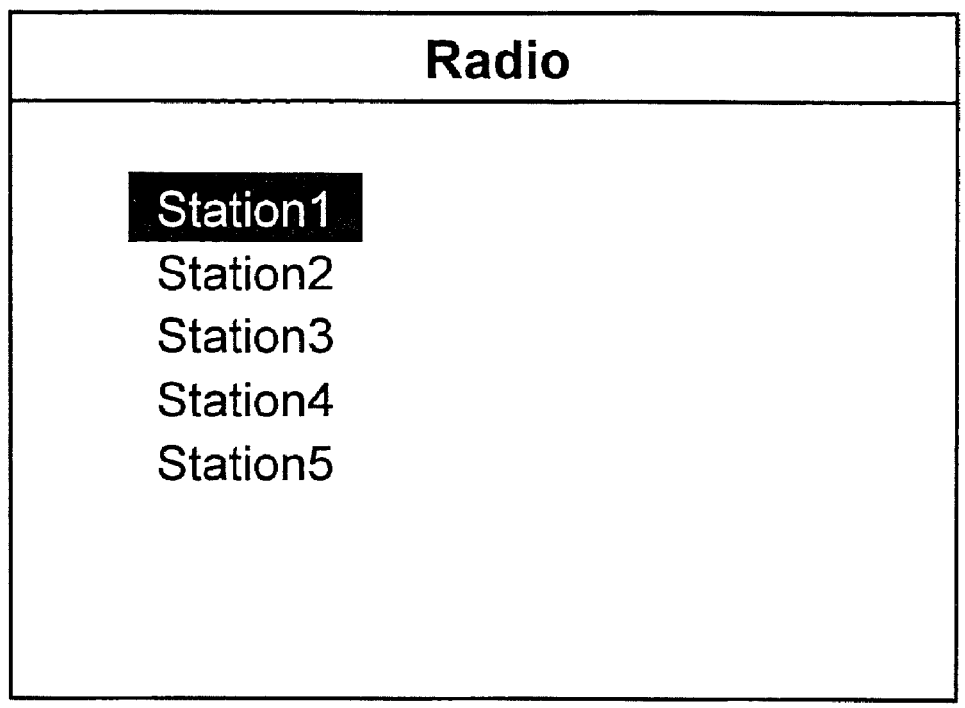
FIG. 5 shows the depiction of a display during operation of a radio.

FIG. 5 shows the exemplary use of control knob 1 or 100. In the present example, a car radio is to be operated in which a radio transmitter is selected from a list. It is evident in FIG. 5 that currently the five radio transmitters station 1 to station 5 can be received. At present, the name of station 1 is emphasized. The on-board computer transmits to electronics 16 of control knob 1 or 100 that it is to allow five detent positions of rotatable part 3 and the current selection corresponds to the first position. Thereupon, electronics 16 blocks the rotation of rotatable part 3 counterclockwise by supplying current to electromagnet 7 in such a way that ball 9 comes into contact with locking contour 6. If the user turns rotatable part 3 one notch in the clockwise direction, electronics 16 determines this from the output signal of light barrier 19. Electronics 16 signals this rotation to the on-board computer, which thereupon sets the selection to station 2. Further rotation of rotatable part 3 in the clockwise direction is possible until station 5 is selected and further rotation of rotatable part 3 is prevented by means of electromagnet 10. If the user selects a station by pressing button cap 13 or the entire control knob 100, electronics 16 transmits this to the on-board computer, which thereupon changes to the selected radio transmitter.

The preceding exemplary embodiments are provided purely by way of example and are not limiting in this respect. This relates particularly to the use of the control knob of the invention, which extends beyond the selection of a radio transmitter to any operation of an on-board computer or another device. The structure of the control knob may also deviate from the forms shown in FIGS. 1 to 4, without going beyond the inventive concept. Thus, for example, a symbol, particularly an illuminable symbol, can be set into the top side of the control knob. It is possible furthermore by means of a display to project a variable symbol on the top side of the control knob. Furthermore, means to produce an exposed detent, for example, a center detent, may be present in the control knob. The controlling of these additional components is also taken over by the control knob electronics.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A control knob for use in a motor vehicle, the control knob comprising:
   a hub for attaching the control knob to a shaft;
   a torsion-proof part;
   a rotatable part;
   a rotation angle sensor;
   device for generating rotary haptics; and
   an electronic system via which the components located in the control knob are controlled and signals of the sensors are evaluated and via which the control knob is connected to on-board electronics of the motor vehicle.

2. The control knob according to claim 1, wherein the device for generating the rotational haptics is formed by a detent spring acting together with a detent contour.

3. The control knob according to claim 2, further comprising an adjustable tappet, which is configured to contact the detent contour.

4. The control knob according to claim 1, further comprising a locking device to block the rotation of the rotatable part of the control knob.

5. The control knob according to claim 4, wherein the locking device is formed by at least one electromagnet via which a ball is brought into contact with a locking contour disposed on the rotatable part.

6. The control knob according to claim 5, wherein the locking contour is disposed on a ring-shaped end face of the rotatable part.

7. The control knob according to claim 1, further comprising a display for displaying a variable symbol on a top side of the control knob.

8. The control knob according to claim 1, further comprising a pushbutton provided on a top side of the control knob.

9. The control knob according to claim 1, wherein the control knob is slidable along the shaft relative to the hub.

\* \* \* \* \*